United States Patent
Oishi

(10) Patent No.: US 7,530,100 B2
(45) Date of Patent: May 5, 2009

(54) APPARATUS FOR LIMITING USE OF PARTICULAR NETWORK ADDRESS

(75) Inventor: Kazuomi Oishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 10/799,215

(22) Filed: Mar. 11, 2004

(65) Prior Publication Data

US 2004/0243850 A1    Dec. 2, 2004

(30) Foreign Application Priority Data

May 29, 2003    (JP)    ............................. 2003-152834

(51) Int. Cl.
*G06F 9/00* (2006.01)
*G06F 17/00* (2006.01)

(52) U.S. Cl. .......................... 726/11; 709/245

(58) Field of Classification Search .................. 726/11; 709/245
See application file for complete search history.

(56) References Cited

U.S. PATENT DOCUMENTS

| | | | | |
|---|---|---|---|---|
| 5,826,014 | A * | 10/1998 | Coley et al. | 726/12 |
| 6,101,499 | A * | 8/2000 | Ford et al. | 707/10 |
| 6,178,455 | B1 * | 1/2001 | Schutte et al. | 709/228 |
| 6,629,149 | B1 * | 9/2003 | Fraser et al. | 709/245 |
| 6,704,789 | B1 * | 3/2004 | Ala-Laurila et al. | 709/230 |
| 6,745,333 | B1 * | 6/2004 | Thomsen | 726/23 |
| 6,922,412 | B2 * | 7/2005 | Hrastar et al. | 370/401 |
| 6,930,988 | B2 * | 8/2005 | Koodli et al. | 370/331 |
| 6,959,009 | B2 * | 10/2005 | Asokan et al. | 370/475 |
| 7,075,897 | B2 * | 7/2006 | Uematsu | 370/255 |
| 7,155,500 | B2 * | 12/2006 | Nikander | 709/223 |
| 2002/0133573 | A1 * | 9/2002 | Matsuda et al. | 709/220 |
| 2002/0133607 | A1 * | 9/2002 | Nikander | 709/229 |
| 2003/0026230 | A1 * | 2/2003 | Ibanez et al. | 370/338 |
| 2004/0088544 | A1 * | 5/2004 | Tariq et al. | 713/162 |

OTHER PUBLICATIONS

R. Hinden and S. Deering, RFC 2373, IP Version 6 Addressing Architecture, Jul. 1998, pp. 6 and 7.*
Charles E. Perkins and Jim Bound, DHCP for IPv6, Jun. 30-Jul. 2, 1998, Computers and Communications, pp. 493-497.*
S. Thomson & T. Narten; RFC 2462—IPv6 Stateless Address Autoconfiguration; Dec. 1999.*
T. Narten & R. Draves; RFC 3041—Privacy Extensions for Stateless Address Autoconfiguration in IPv6; Jan. 2001.*
http://www.ietf.org/rfc/rfc2373.txt?number=2373.
http://www.ietf.org/rfc/rfc2374.txt?number=2374.
http://www.ietf.org/rfc/rfc2375.txt?number=2375.
http://www.ietf.org/rfc/rfc2450.txt?number=2450.
http://www.ietf.org/rfc/rfc2461.txt?number=2461.
http://www.ietf.org/rfc/rfc2462.txt?number=2462.
http://www.ietf.org/rfc/rfc3513.txt?number=3513.

* cited by examiner

*Primary Examiner*—Kambiz Zand
*Assistant Examiner*—James Turchen
(74) *Attorney, Agent, or Firm*—Canon USA Inc IP Div

(57) ABSTRACT

An apparatus for limiting the use of a network address acquires identification data specific to a device connected to the network and generates a message preventing the device from using a network address generated based on the identification data. An apparatus for limiting data transfer detects that a device connected to a network sends data containing a network address generated based on an identifier specific to the device and prevents such data from being transferred.

9 Claims, 6 Drawing Sheets

APPARATUS FOR LIMITING USE OF PARTICULAR NETWORK ADDRESS

BACKGROUND OF THE INVENTION

1. Field of the Invention

The present invention relates to an apparatus for limiting the use of a particular network address.

2. Description of the Related Art

Personal computers and workstations supporting IPv6 typically use Ethernet® for the network connection interface, and generate an IPv6 address based on the Ethernet® IEEE identifier (MAC address). Hereinafter, an address generated in the manner described above is called an IEEE EUI-64 IPv6 address.

As described later, there are three types of IPv6 address: link-local addresses, site-local addresses, and (aggregatabale) global addresses.

The IPv6 addressing scheme is described in detail in the following documents:

Request for Comment (RFC) 2373 IP Version 6 Addressing Architecture,

RFC 2374 An IPv6 Aggregatabale Global Unicast Address Format,

RFC 2375 IPv6 Multicast Address Assignment,

RFC 2450 Proposed TLA and NLA Assignment Rule,

RFC 2461 Neighbor Discovery for IP Version 6 (IPv6), and

RFC 2462 IPv6 Stateless Address Autoconfiguration.

IEEE EUI-64 IPv6 addresses of network devices are generated based on the IEEE identifiers (i.e., MAC addresses) of the hardware interfaces (e.g., Ethernet®) used in the network devices, where each hardware interface has a unique IEEE identifier. This approach readily leads to privacy infringement of a network device or the user of the network device, because the activities can easily be identified by monitoring communication involving the IEEE EUI-64 IPv6 address of the network device.

To overcome this problem, procedures for generating random IPv6 addresses, specifically interface IDs, are proposed in, for example, RFC 3041 Privacy Extensions for Stateless Address Autoconfiguration in IPv6. This document also describes a protocol, and its extension, for detecting whether or not a generated random value is already used and, if used, generating another unique random address. This random IPv6 address is called a temporary address or anonymous address.

Not all devices may use an anonymous address. Some devices may be initialized to use an IEEE EUI-64 IPv6 address. Therefore, these devices may be subject to privacy infringement if the IEEE EUI-64 IPv6 address is used continuously.

SUMMARY OF THE INVENTION

An object of the present invention is to protect the privacy of network devices. Other objects of the present invention include protecting privacy in a simple manner, protecting privacy while maintaining system operability, limiting data transfer which may lead to privacy infringement, and limiting the scope in which addresses uniquely corresponding to particular devices or the users of the devices can be used.

According to an aspect of the present invention, a method for limiting the use of a network address includes the steps of acquiring identification data specific to a device connected to the network, and sending a message preventing the device from using a network address generated based on the identification data.

According to another aspect of the present invention, computer-executable process steps (i.e., a program) for limiting the use of a network address include acquiring identification data specific to a device connected to the network, and sending a message preventing the device from using a network address generated based on the identification data.

According to yet another aspect of the present invention, an apparatus for limiting the use of a network address includes a connection section for connecting to a network and acquiring identification data specific to a device connected to the network, and a generation section for generating a message preventing the device from using a network address generated based on the identification data, wherein the connection section sends the message to the device.

According to still yet another aspect of the present invention, a method for limiting data transfer includes the steps of detecting that a device connected to a network sends data containing a network address generated based on an identifier specific to the device, and preventing the data from being transferred.

According to another aspect of the present invention, computer-executable process steps (i.e., a program) for limiting data transfer include detecting that a device connected to a network sends data containing a network address generated based on an identifier specific to the device, and preventing the data from being transferred.

According to another aspect of the present invention, an apparatus for limiting data transfer includes a connection section for connecting to a network, and a prevention section for preventing a device connected to the network from transferring data containing a network address generated based on an identifier specific to the device.

According to the present invention, the privacy of network devices can be protected.

Further objects, features and advantages of the present invention will become apparent from the following description of the preferred embodiments with reference to the attached drawings.

DESCRIPTION OF THE PREFERRED EMBODIMENTS

Embodiments of the present invention will now be described by way of an example where a host connects to the Internet via an Ethernet® LAN. An existing network mechanism is first described, followed by a description of embodiments according to the present invention.

Figure 1:
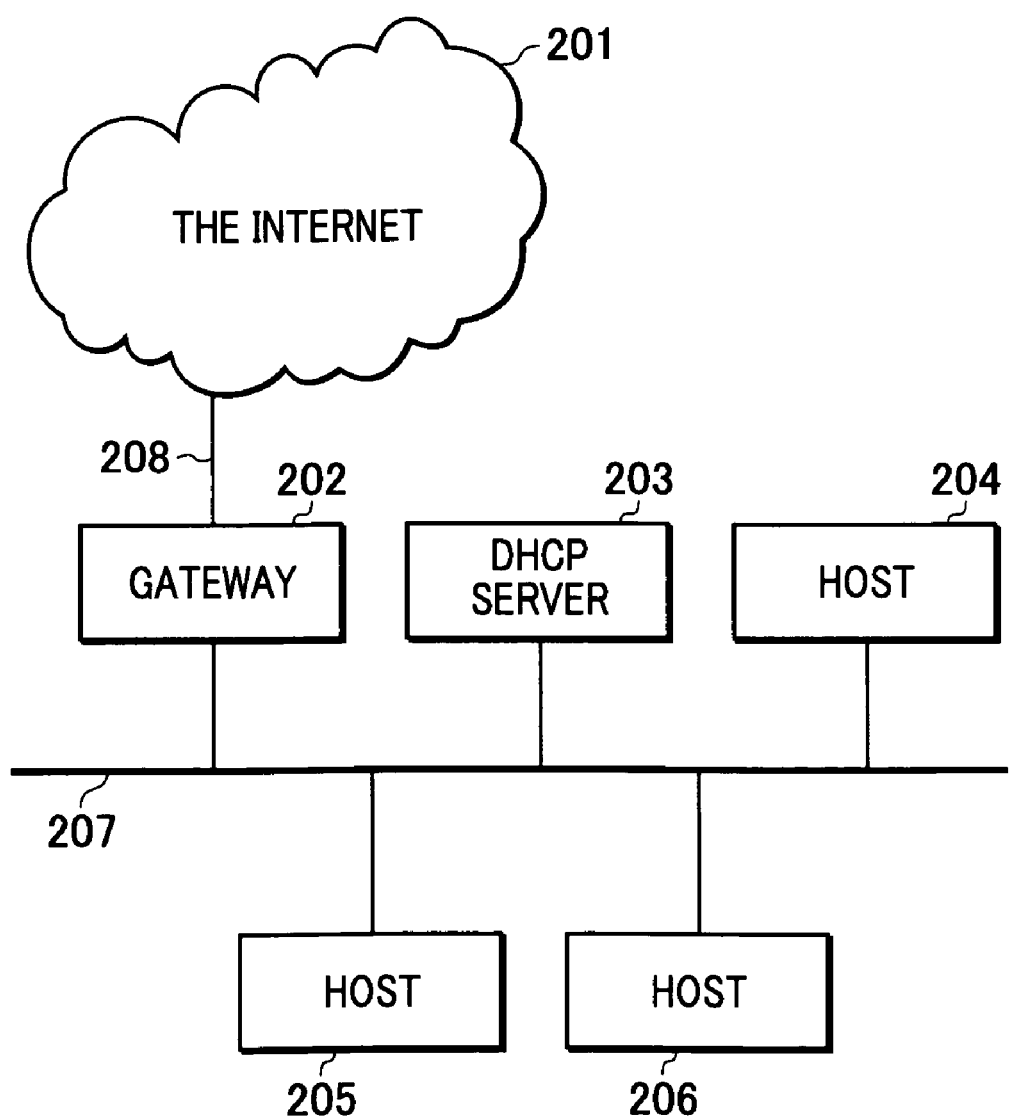
FIG. 1 is a schematic diagram of an Ethernet LAN.

FIG. 1 is a schematic diagram of a network to which the present invention is applied. This network assumes that a host connects to the Internet via an Ethernet® LAN.

In FIG. 1, hosts 204, 205, and 206 connected to the LAN access the Internet 201 via a gateway 202. According to the embodiments of the present invention, each host is connected to a link 207. The gateway 202 is connected to the Internet 201 via a link 208. A link is a facility or medium that allows devices connected to the same link to communicate with each other or with other devices that are connected via a different link. A link corresponds to the layer underneath the IP layer. In addition to Ethernet®, a link may be realized by a PPP link, X.25, Frame Relay, or ATM network. IPv6 devices connected to a link are referred to as nodes. The network of FIG. 1 also includes a DHCP server 203.

Figure 2:
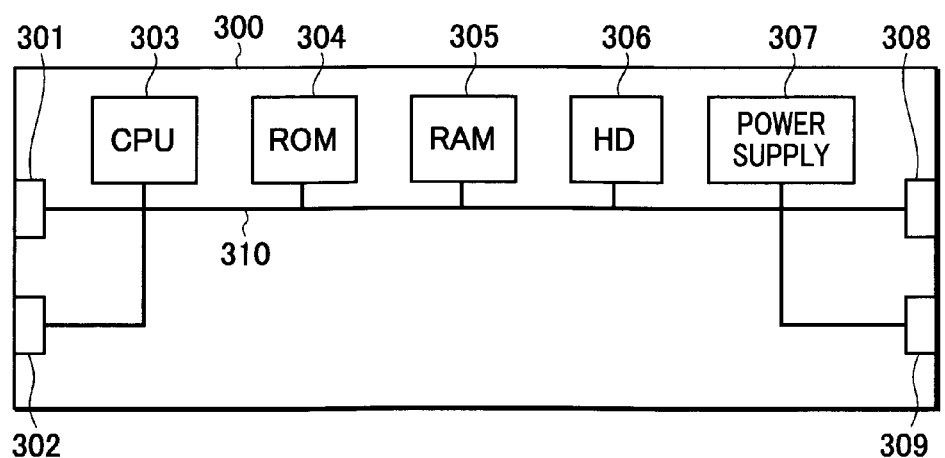
FIG. 2 shows an internal structure of a node.

FIG. 2 shows a typical internal structure of a node 300 on a network.

The node 300 may be a router or a host. A router forwards packets destined for devices other than itself, whereas a host does not. As shown in FIG. 2, the node 300 is a computer which includes network interfaces 301 and 302, a CPU 303, a read-only memory (ROM) 304, a random access memory (RAM) 305, a hard disk (HD) 306, a power supply 307, a keyboard/pointing-device interface 308, a monitor interface 309, and a bus 310.

If the node 300 is a router, it has multiple interfaces 301 and 302. If the node 300 is a host, it typically has a single interface 301. The network interface 301 is connected to the link 207 to allow the node 300 to communicate with other nodes connected to the link 207.

Through the network interface 301, the hosts 204, 205, and 206 communicate with other nodes connected to the link 207 via the link 207 as well as with sites on the Internet 201 via the gateway 202. In the case where the gateway 202 functions as a router, the network interface 301 in the gateway 202 is connected to the link 207, via which the gateway 202 communicates with other devices on the link 207. The network interface 302 in the gateway 202 is connected to the link 208, via which the gateway 202 is connected to the Internet 201 and communicates with nodes on the Internet 201.

The following processing is achieved by an apparatus or a computer program. An apparatus that carries out the following steps is included in the node 300. A computer program that carries out the following steps is stored in the ROM 304 or the HD 306 of a node. A computer program that carries out the following steps is loaded by the CPU 303 to, for example, assign an address to the interfaces 301 and 302 via the bus 310, while using the RAM 305 as a work area for calculation if necessary.

The mechanism of the protocol for each host to detect the prefix of an IPv6 global address or the address of the default gateway in the Ethernet® LAN environment will be described first, followed by a description of the embodiments of the present invention.

A typical IPv6 address is comprised of 128 bits, where the high-order 64 bits include a prefix and the low-order 64 bits include an interface ID. The interface ID is generated based on the 48-bit MAC address of the Ethernet® interface. The interface ID generated based on the 48-bit MAC address of the Ethernet® interface is called an IEEE EUI-64 interface ID. The IPv6 address generated based on the IEEE EUI-64 interface ID is called an IEEE EUI-64 IPv6 address.

Figure 3:
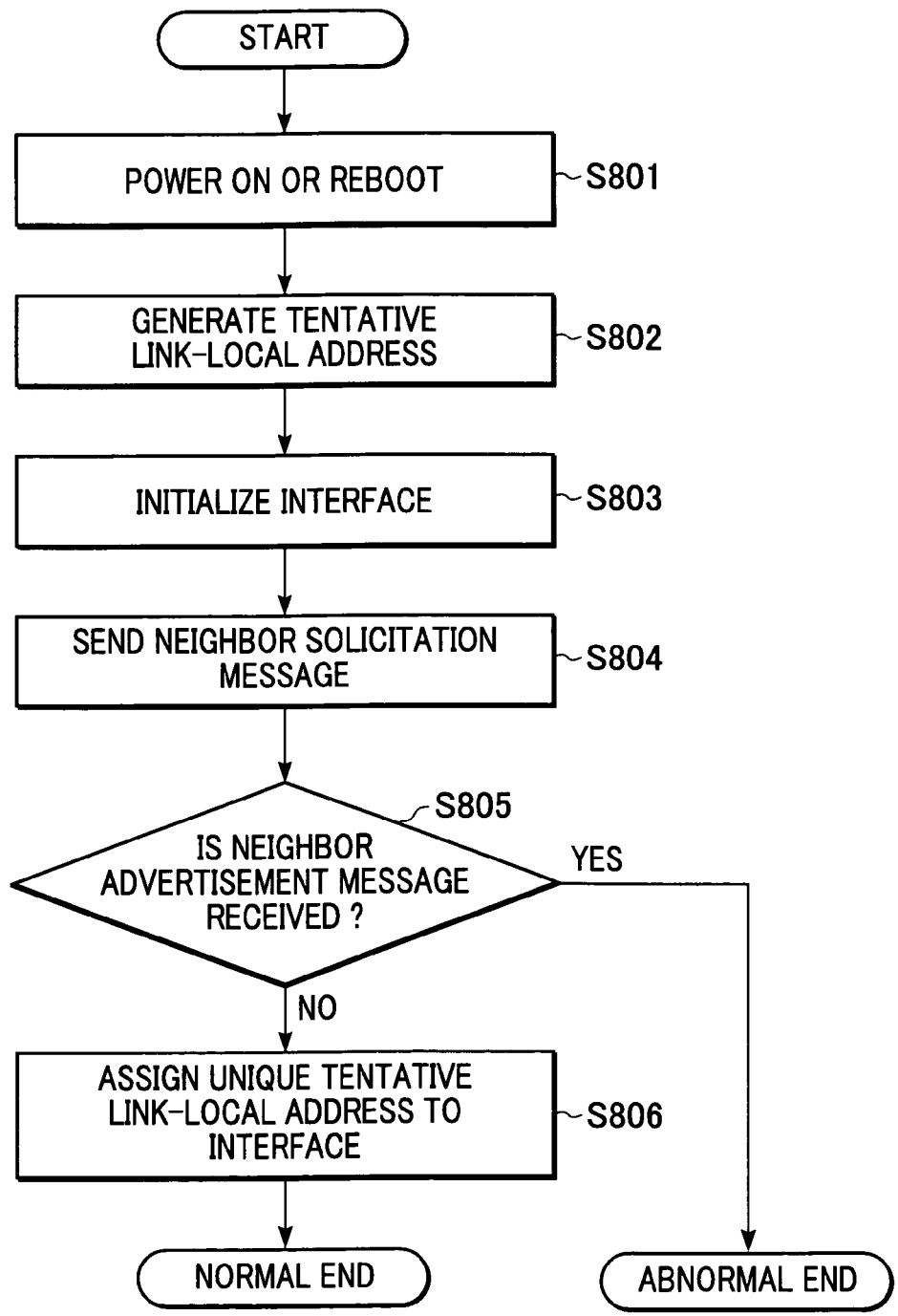
FIG. 3 is a flowchart showing the steps of DAD by a host.

FIG. 3 is a flowchart showing how a node in FIG. 2 operates when it is powered ON or rebooted. This operation is called duplicate address detection (DAD).

Referring to FIG. 3, when the node 300 in FIG. 2 (i.e., a node in FIG. 1) is powered ON or rebooted (step S801), the node 300 generates an interface ID based on the Ethernet® MAC address of the network interface 301 and adds a predetermined prefix to the interface ID, thus producing a tentative link-local address (step S802).

The node 300 proceeds to the following processing to determine whether the tentative link-local address is unique on the link 207.

In step S803, the node 300 initializes the interface 301. Specifically, the node 300 assigns to the interface 301 the all-nodes multicast address (FF02::1) and the solicited-node multicast address of the tentative link-local address.

Assignment of the all-nodes multicast address allows the node 300 to receive data from another node that already uses the tentative link-local address. Assignment of the solicited-node multicast address of the tentative link-local address allows the node 300 to detect another node that is also going to use the same tentative link-local address.

As defined in page 91 of RFC 2461, the solicited-node multicast address of a tentative link-local address is a link-local scope multicast address as obtained by adding the low-order 24 bits of the tentative link-local address to the prefix FF02:0:0:0:0:1:FF00::/104.

The node 300 then generates a Neighbor Solicitation message. For this purpose, the Neighbor Solicitation message is set to have the tentative link-local address to be judged in Target Address, the unspecified address (i.e., where all the 128 bits are 0) in IP Source (source address), and the solicited-node multicast address of the tentative link-local address in IP Destination (destination address).

In step S804, the node 300 sends this Neighbor Solicitation message to the link (i.e., Ethernet® LAN) 207 at intervals of RetransTimer milliseconds as many times as specified in DupAddrDetectTransmits.

Nodes that have received the Neighbor Solicitation message judge that the message is from a node doing DAD by detecting the unspecified address in the source address.

If two or more nodes are carrying out DAD for the same address, each node knows that another node is also doing DAD for the address when the node receives a Neighbor Solicitation messages containing the same address in Target Address, as well as its own Neighbor Solicitation messages (i.e., the node receives both its own Neighbor Solicitation message and a Neighbor Solicitation message sent by another node that is carrying out DAD for the same address). If this is the case, no nodes use the address.

If a node that has received the Neighbor Solicitation message uses the address specified in Target Address of the message, the node returns to the all-nodes multicast address a multicast Neighbor Advertisement having the tentative link-local address set in Target Address. Thus, if the node 300 that has sent a Neighbor Solicitation message receives a multicast Neighbor Advertisement sent to the all-nodes multicast address, and if the target address contains the tentative address to be judged (i.e., if "YES" is applicable at step S805 in FIG. 3), the tentative address is judged not to be unique (i.e., to be duplicated) and the process ends.

If the tentative link-local address is judged to be unique on the link 207 ("NO" at step S805 in FIG. 3) as a result of the processing described above, the node 300 assigns the address as a link-local address to the interface 301 in step S806.

The DAD operation described above with reference to FIG. 3 can be carried out by any of the gateway 202, DHCP server 203, host 204, host 205, and host 206.

After the node 300 (e.g., the host 206 in FIG. 1) has assigned the link-local address to the interface 301, the host 206 then attempts to acquire information necessary to determine the global address and the site-local address. This is referred to as Router Advertisement.

Figure 4:
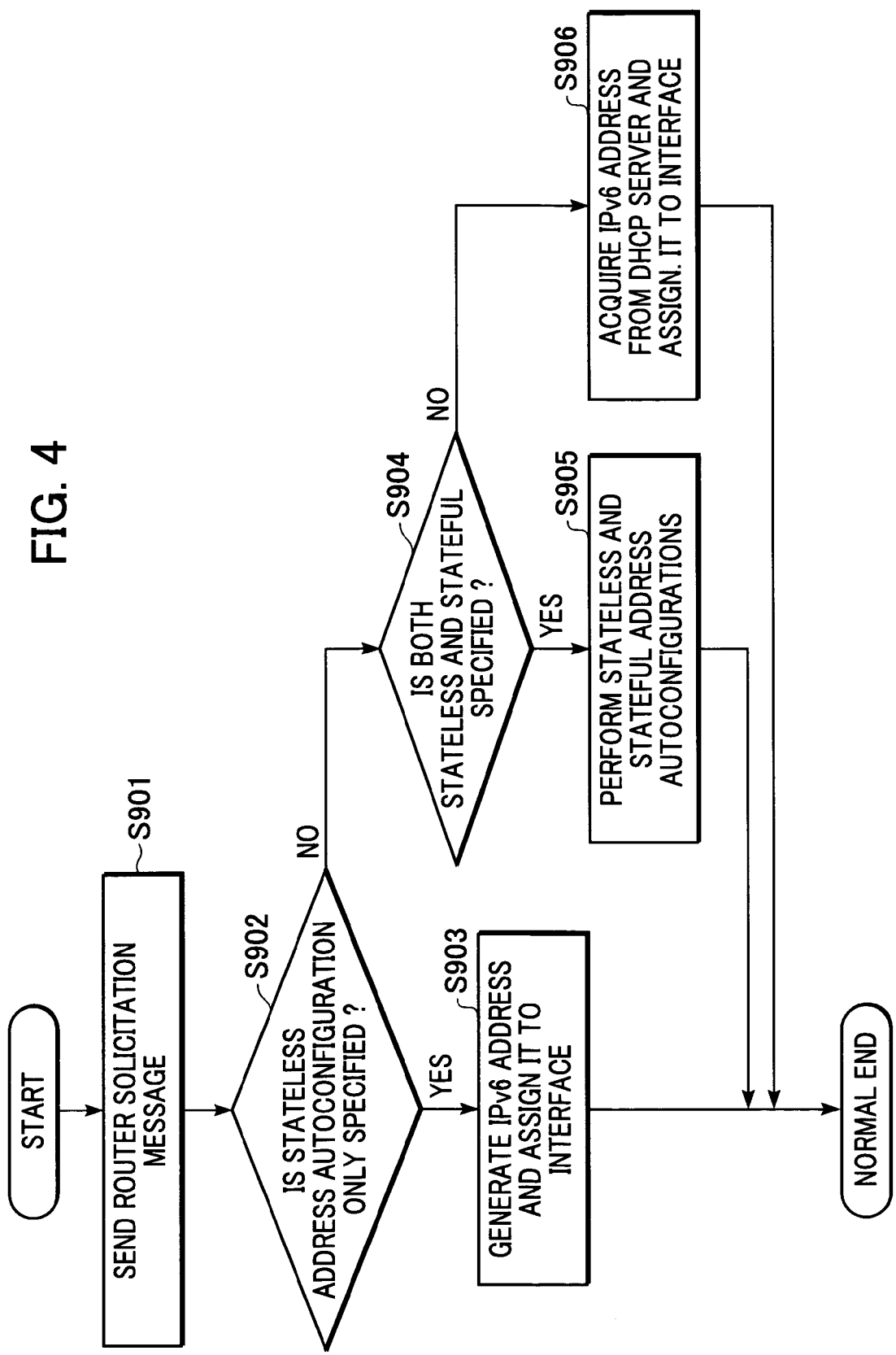
FIG. 4 is a flowchart showing the steps of address autoconfigurations by a host.

The method for acquiring a Router Advertisement is described below with reference to FIG. 4. For the following description, the gateway 202 is presumed to send a Router Advertisement. The gateway 202 is commonly referred to as a router, thus, hereinafter "gateway 202" is referred to as "router 202". The router 202 has necessary information set by an administrator, and periodically sends a Router Advertisement to the link 207. If the host 206 needs to acquire a Router Advertisement sooner, the host 206 sends data called Router Solicitation to the router 202. Immediately after having assigned the link-local address, the host 206 does not know the existence of the router 202, and hence the host 206 in fact multicasts Router Solicitation to all routers on the link 207 (step S901).

When the router 202 receives the Router Solicitation, it sends back a Router Advertisement. If, in step S902, the host 206 has received a Router Advertisement in which Stateless Address Autoconfiguration only is specified, the host 206 checks the validity of the prefix(es) contained in the message to ensure that, among other things, the prefix(es) is not used by the host 206. Then, in step 903, the host 206 assigns the address composed of the prefix(es) and the interface ID to the interface 301 as the site-local address or global address(Stateless Address Autoconfiguration).

If, in step S902, the host 206 does not receive a Router Advertisement in which Stateless Address Autoconfiguration only is specified, flow proceeds to step S904, where a determination is made whether the host 206 receives a Router Advertisement in which both Stateless Address Autoconfiguration and Stateful Address Autoconfiguration are specified. In the case where both Stateless Address Autoconfiguration and Stateful Address Autoconfiguration are specified, Stateless and Stateful Address Autoconfigurations are performed in step S905. In the case where both Stateless Address Autoconfiguration and Stateful Address Configuration are not specified, flow proceeds to step S906.

In step 906, the host 206 carries out Stateful Address Autoconfiguration, i.e., DHCP v6 only, as described below.

Details such as messages or their contents associated with Stateful Address Autoconfiguration are described in RFC 3315 Dynamic Host Configuration Protocol for IPv6 (DHCPv6). The flow of the basic operation is as follows.

The host 206 sends a DHCP Solicit message to the DHCP server 203. The host 206 does not know where the DHCP server 203 exists, and hence multicasts a DHCP Solicit message onto the link 207 for the DHCP servers.

When the DHCP server 203 receives the DHCP Solicit message, the DHCP server 203 responds by returning a DHCP Advertise message to the host 206. The DHCP Advertise message reaches the host 206. When receiving the DHCP Advertise message, the host 206 is informed of the address of the DHCP server 203.

The host 206 then sends a DHCP Request message to the DHCP server 203. When receiving the DHCP Request message, the DHCP server 203 sends back a DHCP Reply message to the host 206.

When receiving the DHCP Reply message, the host 206 determines the site-local address or global address from the DHCP Reply message, and then performs processing necessary for DAD in order to check whether the interface ID in the address is duplicated. In short, the host 206 sets the multicast address described above and other information to the interface 301.

The host 206 then sends a Neighbor Solicitation message and sees whether or not a Neighbor Advertisement message is returned. If a Neighbor Advertisement message is received, the host 206 judges that the address is duplicated, and hence repeats sending of the DHCP Request message and the subsequent steps in order to receive another address from the DHCP server 203.

When the host 206 does not receive a Neighbor Advertisement message, the host 206 judges that the address is not duplicated and then assigns the address to the interface 301.

When the host 206 does not receive a Router Advertisement at step S904, Stateful Address Autoconfiguration is carried out at step 906 as described above and the processing ends normally.

If the host 206 receives a Router Advertisement in which both Stateless Address Autoconfiguration and Stateful Address Autoconfiguration are specified at step S904, the host 206 carries out both Stateless Address Autoconfiguration and Stateful Address Autoconfiguration at step S905.

In this manner, the host 206 using Ethernet® as an interface can automatically set a link-local address, a site-local address, a global address, a default gateway, etc. by using any combination of Stateless Address Autoconfiguration and Stateful Address Autoconfiguration (DHCPv6).

If an anonymous address is to be used, the above-mentioned protocol is extended as follows. At step S903 or step S905 in FIG. 4, the host 206 receives the Router Advertisement, checks the validity of the prefix(es) contained in the message, for example, to ensure that the prefix(es) is not used by the host 206, and then assigns the addresses composed of the prefix(es) plus IEEE EUI-64 and random interface IDs to the interface 301 as the site-local address or global address. At this time, the random interface ID and the IEEE EUI-64 interface ID are subjected to the same processing. The procedures for generating a random interface ID are described later.

A new anonymous address is generated by appending the random interface ID to the prefix. If the address already assigned by the host 206 to the interface 301 is the same as the new anonymous address, the host 206 generates a new random interface ID to produce a new anonymous address.

The host 206 then carries out DAD for the anonymous address. If DAD reveals that another device already uses the anonymous address, the host 206 generates a new anonymous address. If a unique anonymous address cannot be obtained after the host 206 repeats DAD up to five times, the host 206 logs a system error and gives up the generation of an anonymous address.

A random interface ID is generated using an MD5 message digest. MD5 is a function for outputting a random 128-bit value based on any input. The procedures described in RFC 3041 use 128 bits as an input. These input 128 bits include high-order 64 bits and low-order 64 bits obtained as follows. The IEEE EUI-64 interface ID is used for the low-order 64 bits of the input 128 bits. A random 64-bit value generated in some way or the low-order 64-bit value of the previous MD5 calculation result is used for the high-order 64 bits of the input 128 bits. An MD5 message digest is calculated with these 128 bits as an input and the high-order 64 bits of the 128-bit calculation result are employed. The 7th bit from the left of the obtained 64 bits is set to 0 and the resultant 64 bits are used as the random interface ID. The low-order 64 bits of the calculation result are recorded for the next MD5 calculation.

First Embodiment

A first embodiment according to the present invention will now be described. For this embodiment, a protocol for preventing a node from using an IEEE EUI-64 IPv6 address is described. This protocol works based on the above-described operation.

Communication at the level of the data link layer (e.g., Ethernet®) underneath the IP layer is performed as broadcast packet communication where the MAC addresses of Ethernet® interfaces are used as respective identifiers to identify the Ethernet® interfaces. Therefore, devices that are capable of accessing via Ethernet® can monitor all communication packets and can acquire the source MAC address and the destination MAC address of each packet.

Figure 5:
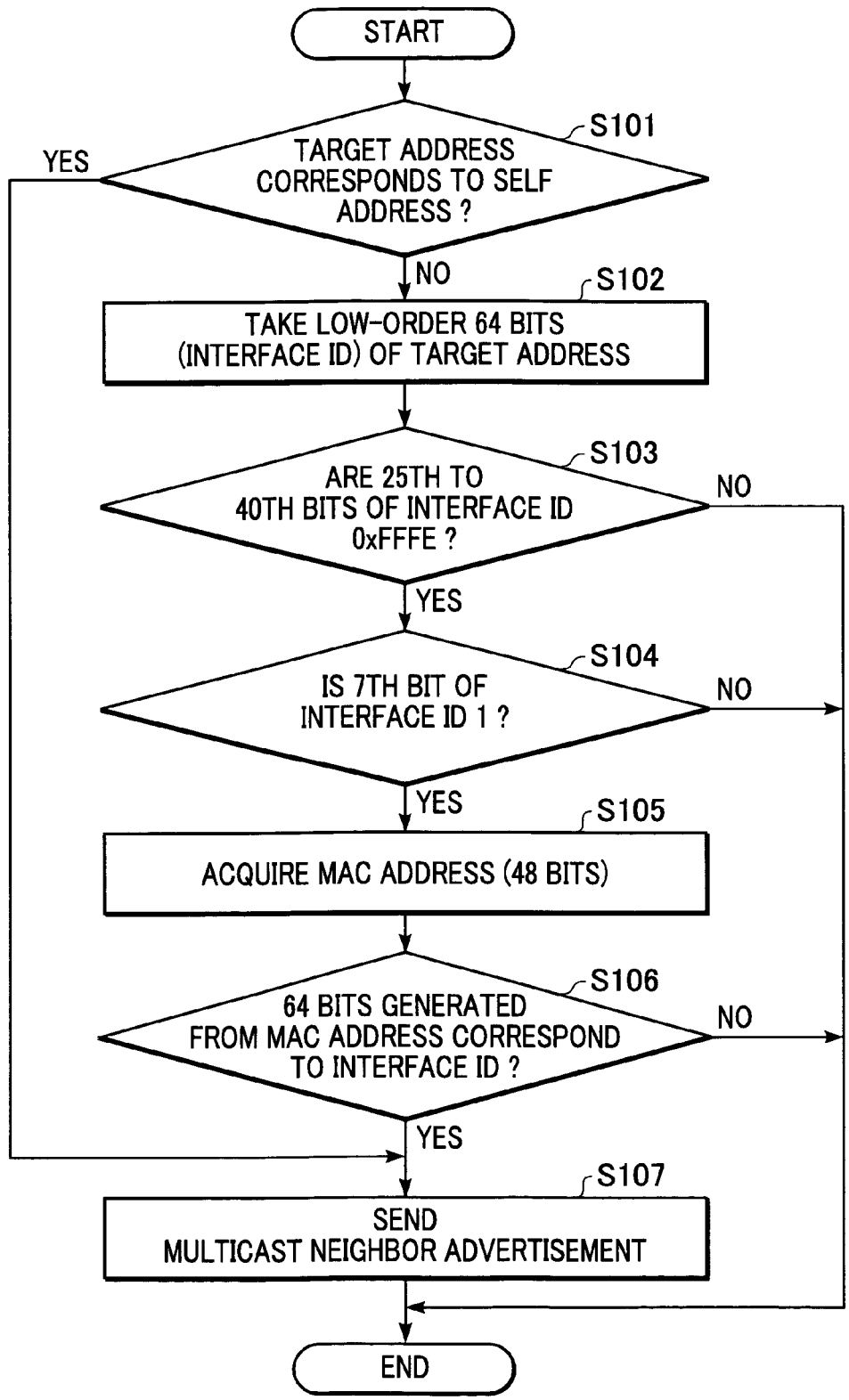
FIG. 5 shows a flowchart for checking a network address.

The operation of an apparatus for limiting the use of a particular address according to this embodiment will be described with reference to FIG. 5. The embodiment is described by way of an example where the host 206 attempts to use an IEEE EUI-64 IPv6 address. The following processing is carried out by an apparatus or a program. A program that carries out the following steps is stored in the ROM 304 or the HD 306 of a node. FIG. 5 shows the main section of the program.

Any IPv6 device connected to the link 207 can acquire the MAC address of the host 206, and hence any of the gateway 202, the DHCP server 203, and the hosts 204, 205, 206 can be the apparatus for limiting the use of a particular address.

The apparatus (i.e., node) for limiting the use of a particular address is installed on the same link (i.e., subnet) 207 as the host (i.e., IPv6 device) 206. The apparatus for limiting the use of a particular address determines whether the IPv6 address to be used by the host 206 is an anonymous (or temporary) address by comparing the anonymous address with the IEEE EUI-64 IPv6 address generated based on the MAC address of the data link layer of the host 206. If the host 206 attempts to use an IEEE EUI-64 IPv6 address, the apparatus for limiting the use of a particular address sends a message indicating that the address is already used to prevent the host 206 from using the address.

Referring to FIG. 5, when the host 206 is powered ON or rebooted, the host 206 carries out DAD. At step S101, the apparatus for limiting the use of a particular address that has received a Neighbor Solicitation message acquires the Target Address to check whether the target address corresponds to its own address. The flow proceeds to step S107 when the target address corresponds to its own address or to step S102 if does not.

At step S102, the apparatus for limiting the use of a particular address acquires the low-order 64 bits (i.e., interface ID) of the Target Address.

Next, at step S103, the apparatus for limiting the use of a particular address checks whether the 25th to 40th bits from the left of the acquired interface ID correspond to 0xFFFE. The flow proceeds to step S104 if the 25th to 40th bits correspond to 0xFFFE. If they do not correspond, the process ends.

At step S104, the apparatus for limiting the use of a particular address checks whether the 7th bit from the left of the acquired interface ID corresponds to 1. The flow proceeds to step S105 if the 7th bit corresponds to 1. If it does not, the process ends.

At step S105, the apparatus for limiting the use of a particular address acquires the source MAC address (i.e., identifier of the source device at the level of the data link layer and the source device-specific identifier) of the Ethernet® packets including the Neighbor Solicitation message.

Then, at step S106, the apparatus for limiting the use of a particular address checks whether the IEEE EUI-64 format 64-bit data generated based on the source MAC address (i.e., source device-specific identifier) corresponds to the interface ID acquired at step S102. The flow proceeds to step S107 if the 64-bit data corresponds to the interface ID. If the 64-bit data does not correspond, the process ends.

At step S107, the apparatus for limiting the use of a particular address sends a multicast Neighbor Advertisement in accordance with the IPv6 Neighbor Discovery Protocol.

In the above-described processing, the host 206 can use an interface ID other than the IEEE EUI-64 interface ID because in this case the host 206 does not receive a multicast Neighbor Advertisement. Therefore, the host 206 can use an IPv6 address generated based on the interface ID other than the IEEE EUI-64 interface ID.

In contrast, when the host 206 attempts to use an IEEE EUI-64 interface ID, the host 206 receives a multicast Neighbor Advertisement, and therefore, cannot use the IEEE EUI-64 interface ID and accordingly, an IPv6 address generated based on the IEEE EUI-64 interface ID. Thus, the host 206 will use another IPv6 address, if possible.

In short, when the source host 206 attempts to use an IPv6 address generated based on the IEEE EUI-64 interface ID, namely, a network address generated in the specified manner based on the source MAC address (i.e., identifier of the source device at the level of the data link layer and the source device-specific identifier), the apparatus for limiting the use of a particular address detects this attempt by the host 206. The apparatus for limiting the use of a particular address then sends a multicast Neighbor Advertisement, i.e., a message indicating that the network address is already used, to notify the host 206 that the network address cannot be used.

Consequently, the host 206 is ruled out from the danger of privacy infringement.

Second Embodiment

A second embodiment of the present invention will now be described. In this embodiment, an address generated based on an IEEE EUI-64 interface ID is allowed, but extra-network communication by using such an address is prevented to protect privacy.

According to this embodiment, an apparatus for limiting the use of a particular address is provided which allows a node to use a link-local address generated based on its IEEE EUI-64 interface ID, but prevents the node from sending data to an external network if the data contains a global address generated based on its IEEE EUI-64 interface ID.

Figure 6:
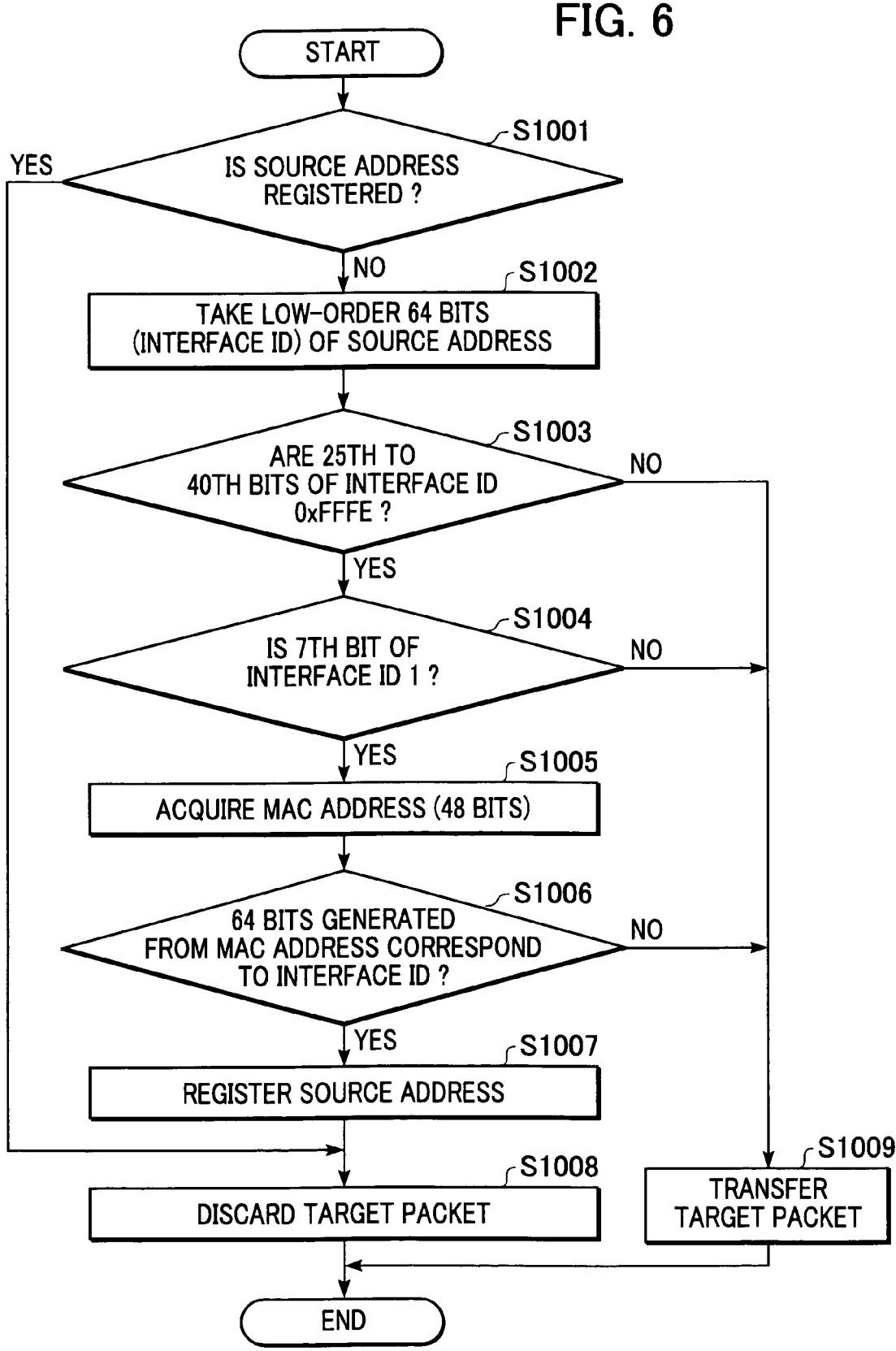
FIG. 6 shows a flowchart for determining whether or not data should be transferred.

The apparatus for limiting the use of a particular address is realized by the gateway (router) 202 in FIG. 1. The operation of the gateway 202 as the apparatus for limiting the use of a particular address is described with reference to FIG. 6. The following processing is realized by an apparatus or a program. A program that carries out the following steps is stored in the ROM 304 or the HD 306 of a node. FIG. 6 shows the main section of the program. For this embodiment, the apparatus for limiting the use of a particular address is capable of generating a list and managing it. This list is stored in the RAM 305. This list holds addresses at step S1007 in FIG. 6 as described below.

The apparatus (i.e., router 202 in this embodiment) for limiting the use of a particular address is installed on the same link (i.e., subnet) 207 as the host (i.e., IPv6 device) 206. The apparatus for limiting the use of a particular address determines whether the IPv6 address used by a host such as the host 206 is an anonymous (or temporary) address by comparing the anonymous address with the IEEE EUI-64 IPv6 address generated based on the MAC address at the link layer of the host 206. The router 202 checks whether each packet contains an IEEE EUI-64 IPv6 address, and discards applicable packets to prevent such packets from going outside the link (i.e., network) 207.

The router 202 handles IPv6 packets that are sent by the host 206 on the link 207 to the Internet 201 in the following manner. IPv6 packets intended to go to the Internet 201, as shown in FIG. 1, are those packets having a destination address in the Internet 201.

Referring to FIG. 6, at step S1001, the router 202 acquires the source address of an IPv6 packet and checks whether the source address is registered in the list in the RAM 305. The flow proceeds to step S1008 if the source address is registered, and to step S1002 if the source address is not registered.

At step S1002, the router 202 acquires the low-order 64 bits (interface ID) of the source address of the IPv6 packet. The router 202, in step S1003, then checks whether the 25th to 40th bits from the left of the interface ID correspond to 0xFFFE. The flow proceeds to step S1004 if the 25th to 40th bits correspond to 0xFFFE and to step S1009 if the bits do not correspond.

At step S1004, the router 202 checks whether the 7th bit from the left of the obtained interface ID is 1. The flow proceeds to step S1005 if the 7th bit corresponds to 1 and to step S1009 if the bit does not correspond.

At step S1005, the router 202 acquires the source MAC address of Ethernet® packet containing the IPv6 packet.

Next, at step S1006, the router 202 checks whether the IEEE EUI-64 format 64-bit data generated based on the source MAC address corresponds to the interface ID acquired at step S1002. The flow proceeds to step S1007 if the 64-bit data corresponds to the interface ID and to step S1009 if the 64-bit data does not correspond.

At step S1007, the router 202 registers the source address of the IPv6 packet in the list and proceeds to step S1008. Thus, for packets having the source address registered in the list, the flow jumps from step S1001 to step S1008, i.e., steps S1002 to S1007 are skipped.

At step S1008, the router 202 discards the IPv6 packet and ends the operation.

If, as described above, in step S1003 the 25th to 40th bits do not correspond to 0xFFFE, then at step S1009, the router 202 transfers the IPv6 packet to the Internet (external network) 201 and then the operation ends.

As is apparent from the operation described above, IPv6 packets having a global address generated from an IEEE EUI-64 interface ID in the source address are discarded by the router 202, and therefore are not transferred to the Internet 201.

In contrast, IPv6 packets having a global address generated from an interface ID other than an IEEE EUI-64 interface ID in the source address are transferred to the Internet 201.

In short, transfer of data containing an IPv6 address generated from an IEEE EUI-64 interface ID, namely, a network address generated in the specified manner from the MAC address (identifier on the data link layer and device-specific identifier) of the source host 206, is detected and blocked by the router 202 as the apparatus for limiting the use of a particular address.

Thus, the node 206 is ruled out from the danger of privacy infringement.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for limiting the use of an internet protocol address, the method comprising:
   receiving a signal from a device connected to a network;
   acquiring the internet protocol address from the signal;
   acquiring a media access control address specific to the device from the signal;
   generating a second internet protocol address according to the acquired media access control address;
   determining whether the media access control address of the device which sends the signal can be identified from the acquired internet protocol address, according to whether the acquired internet protocol address corresponds to the generated second internet protocol address; and
   sending a message preventing the device from using the acquired internet protocol address when it is determined that the media access control address of the device which sends the signal can be identified from the acquired internet protocol address.

2. The method according to claim 1, wherein the message indicates that the acquired internet protocol address is duplicated.

3. A storage medium storing computer-executable process steps for limiting the use of an internet protocol address, the computer-executable process steps comprising:
   receiving a signal from a device connected to a network;
   acquiring the internet protocol address from the signal;
   acquiring a media access control address specific to the device from the signal;
   generating a second internet protocol address according to the acquired media access control address;
   determining whether the media access control address of the device which sends the signal can be identified from the acquired internet protocol address, according to whether the acquired internet protocol address corresponds to the generated second internet protocol address; and
   sending a message preventing the device from using the acquired internet protocol address when it is determined that the media access control address of the device which sends the signal can be identified from the acquired internet protocol address.

4. The storage medium according to claim 3, wherein the message indicates that the acquired internet protocol address is duplicated.

5. An apparatus for limiting the use of an internet protocol address, comprising:
   a connection unit configured to connect to a network and receive a signal from a device connected to the network;
   an acquisition unit configured to acquire the internet protocol address from the signal, and a media access control address specific to the device from the signal;
   an address generation unit configured to generate a second internet protocol address according to the media access control address acquired by the acquisition unit;
   a determination unit configured to determine whether the media access control address of the device which sends the signal can be identified from the acquired internet protocol address, according to whether the acquired internet protocol address corresponds to the generated second internet protocol address; and
   a message generation unit configured to generate a message preventing the device from using the acquired internet protocol address when it is determined that the media access control address of the device which sends the signal can be identified from the acquired internet protocol address; and
   a sending unit configured to send the message to the device.

6. The apparatus according to claim 5, wherein the sending unit sends the message indicating that the acquired internet protocol address is duplicated for preventing the device from using the acquired internet protocol address.

7. A method for limiting data transfer from a first network to a second network, the method comprising:
- receiving a signal with a destination address corresponding to a first device connected to the first network from a second device connected to the second network;
- acquiring an internet protocol address from the signal;
- acquiring a media access control address specific to the second device from the signal;
- generating a second internet protocol address according to the acquired media access control address;
- determining whether the media access control address of the second device can be identified from the acquired internet protocol address, according to whether the acquired internet protocol address corresponds to the generated second internet protocol address;
- sending a message preventing the second device from using the acquired internet protocol address and limiting transfer of the signal when it is determined that the media access control address of the second device can be identified from the acquired internet protocol address; and
- transmitting the signal to the first network when it is determined that the media access control address of the second device cannot be identified from the acquired internet protocol address.

8. A storage medium storing computer-executable process steps for limiting data transfer from a first network to a second network, the computer-executable process steps comprising:
- receiving a signal with a destination address corresponding to a first device connected to the first network, from a second device connected to a network;
- acquiring an internet protocol address from the signal;
- acquiring a media access control address specific to second the device from the signal;
- generating a second internet protocol address according to the acquired media access control address;
- determining whether the media access control address of the second device can be identified from the acquired internet protocol address, according to whether the acquired internet protocol address corresponds to the generated second internet protocol address;
- sending a message preventing the second device from using the acquired internet protocol address and limiting transfer of the signal when it is determined that the media access control address of the second device can be identified from the acquired internet protocol address; and
- transmitting the signal to the first network when it is determined that the media access control address of the second device cannot be identified from the acquired internet protocol address.

9. An apparatus for limiting data transfer from a first network to a second network, comprising:
- a connection unit configured to connect the first network and the second network and receive a signal with a destination address corresponding to the first device connected to the first network, from a second device connected to the second network;
- an acquisition unit configured to acquire an internet protocol address from the signal, and a media access control address specific to the second device from the signal;
- an address generation unit configured to generate a second internet protocol address according to the acquired media access control address;
- a determination unit configured to determine whether the media access control address of the second device can be identified from the internet protocol address acquired from the signal, according to whether acquired internet protocol address corresponds to the generated second internet protocol address;
- a limiting unit configured to limit transfer of the signal, and send a message preventing the second device from using the acquired internet protocol address when it is determined that the media access control address of the second device can be identified from the acquired internet protocol address; and
- a transmission unit configured to transmit the signal to the first network when it is determined that the media access control address of the second device cannot be identified from the acquired internet protocol address.

* * * * *